United States Patent [19]

Wood

[11] 4,347,951
[45] Sep. 7, 1982

[54] AERIAL DISPENSING APPARATUS

[75] Inventor: Arthur D. Wood, Ottawa, Canada

[73] Assignee: Canadian Patents & Development Limited, Ottawa, Canada

[21] Appl. No.: 203,909

[22] Filed: Nov. 4, 1980

[30] Foreign Application Priority Data

Dec. 18, 1979 [CA] Canada ................................. 343202

[51] Int. Cl.³ .............................................. G07F 11/00
[52] U.S. Cl. ..................................... 221/86; 221/197; 221/258
[58] Field of Search ...................... 221/69, 76, 86, 197, 221/287, 82, 258, 277

[56] References Cited

U.S. PATENT DOCUMENTS

| 757,956 | 4/1904 | Payne | 221/82 |
| 2,522,770 | 9/1950 | Baird | 221/82 |
| 3,654,890 | 4/1972 | Rigney et al. | 221/69 |
| 3,755,962 | 9/1973 | Walters et al. | 244/136 |

Primary Examiner—Joseph J. Rolla
Assistant Examiner—Patricia Ray
Attorney, Agent, or Firm—R. G. Bitner

[57] ABSTRACT

A dispensing apparatus for sequential release of articles, particularly suited for aerial reforestation. The apparatus comprises a rotating cylindrical magazine having peripherally arranged receptacles, a stepping selector sleeve with a helical row or row of apertures that align with the receptacles and an outer casing with an opening allowing sequential release of articles as the magazine and selector sleeve rotate.

5 Claims, 3 Drawing Figures

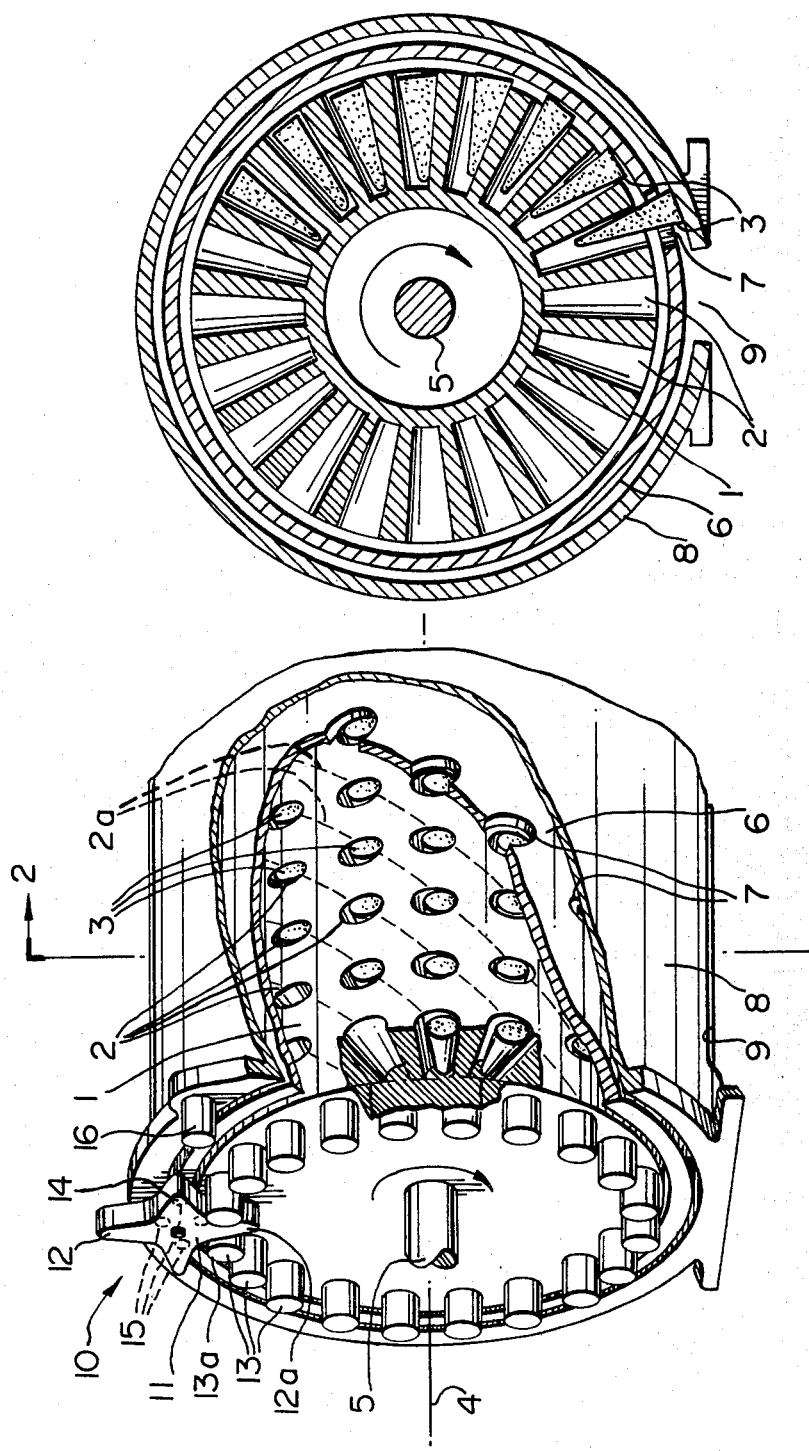

AERIAL DISPENSING APPARATUS

BACKGROUND OF THE INVENTION

This invention relates to an apparatus for the aerial dispensing of articles, such as planting containers.

For reforestation, particularly in remote or difficult terrain, it is desirable to be able to perform the planting operation from aircraft. However, to date, no entirely satisfactory system has been devised. Aerial methods presently in use consist of dispensing seeds or seeds coated with material such as clay. Because of the low incidence of germination this method requires very large numbers of seeds, and the spacing of trees is difficult to control.

U.S. Pat. No. 3,755,962 by J. Walters describes a method and apparatus for the aerial planting of containerized seeds or seedlings including an apparatus for dispensing the containers from an aircraft. In the dispensing apparatus shown the containers are fed along guideways by container engaging arms attached to endless chains, differing substantially from the present invention.

SUMMARY OF THE INVENTION

It is an object of the present invention to provide an apparatus for the serial dispensing of articles, such as planting containers.

The present invention provides an aerial dispensing apparatus comprising: a cylindrical magazine having a plurality of receptacles for receiving articles arranged in helical rows about the periphery thereof, said magazine being rotatable about a central longitudinal axis thereof; a rotatable selector sleeve disposed concentrically around the magazine, said selector sleeve having a helical row of apertures arranged to align with a row of receptacles of the magazine; stepping means operatively interconnecting said selector sleeve with the magazine for sychronized rotation throughout a major portion of each revolution thereof, and once every revolution to step the selector sleeve angularly, relative to the magazine, an amount corresponding to the angular spacing of adjacent helical rows of receptacles of the magazine; an outer casing disposed around the selector sleeve, said casing having longitudinally extending opening means for allowing sequential release of articles from the receptacles as the apertures of the selector sleeve sequentially align with the said opening means.

BRIEF DESCRIPTION OF THE DRAWINGS

FIG. 1 is a partially fragmented view of an embodiment of the dispensing apparatus of the present invention.

FIG. 2 is a sectional view taken at 2—2 of FIG. 1.

DESCRIPTION OF PREFERRED EMBODIMENTS

Figure 3:
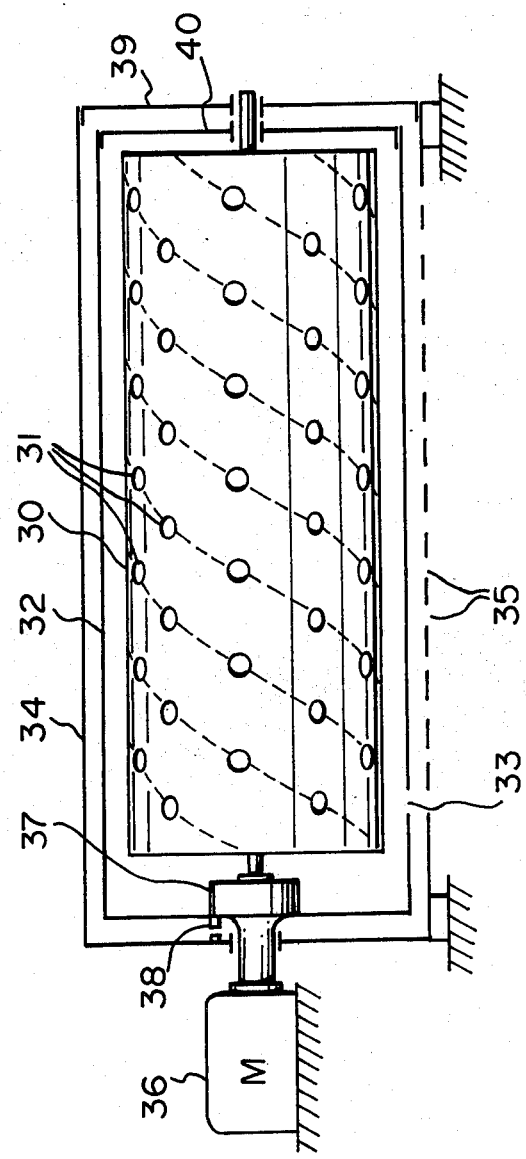
FIG. 3 is a schematic drawing illustrating an alternative stepping means.

With reference to FIGS. 1 and 2, the aerial despensing apparatus of the present invention comprises a cylindrical magazine 1 having a plurality of receptacles 2, for articles 3, arranged in helical rows, 2a about the magazine 1. The magazine 1 is rotatable about the central longitudinal axis 4, and driven by suitable drive means, not shown, through the shaft 5.

Disposed concentrically around the magazine 1 is a rotatable selector sleeve 6 having a helical series of apertures 7 arranged to align with a row of receptacles 2a of the magazine.

Disposed around the selector sleeve 6 is a casing 8 which restrains the articles that are aligned with the selector sleeve apertures 7. The casing has longitudinally extending opening means 9 adapted to allow sequential discharge of articles from the receptacles 2 through the apertures 7 of the selector sleeve 6 as the magazine 1 and selector sleeve 6 rotate.

As shown the opening means 9 is near the bottom such that the articles from the magazine leave under the force of gravity.

Interconnecting the selector sleeve 6 and the driven magazine 1 is a stepping mechanism 10. The particular stepping assembly 10 illustrated in FIG. 1 comprises a gear 11 and cooperating studs 13, a detent mechanism with a spring biased ball 14 and recesses 15, and stop means 16. The gear 11 is rotatably attached to the selector sleeve 6. The teeth 12 of the gear 11 are adapted to engage studs 13 attached to the magazine 1. The number of studs corresponds with the number of helical rows of receptacles. The gear 11 is releasably locked with respect to the selector sleeve 6 by the detent mechanism comprising a spring biased ball 14 disposed in the sleeve 6 which is adapted to engage successive recesses 15 in the gear 11, the number of recesses corresponding to the number of gear teeth 12. The fixed stud 16 shown attached to the casing 8 provides a stop means for engaging a tooth 12 of gear 11 as the sleeve 6 rotates.

In operation, with reference to FIGS. 1 and 2, the magazine 1 is rotated about a horizontal axis 4 by suitable drive means connected to the shaft 5. For a major portion of each revolution, the selector sleeve 6 rotates in synchronism with the magazine 1, due to the interconnecting stepping assembly 10. Specifically, the detent mechanism, comprising the spring biased ball 14 and recesses 15, prevents the gear 11 from rotating whereby the stud 13a which is in engagement with the tooth 12a, carries the gear and with it the selector sleeve 6.

The helical row of apertures 7 are arranged in the selector sleeve 6 such that they align with a corresponding helical row of receptacles 2a as the magazine 1 and selector sleeve 6 are rotated together. While rotating, the articles 3 are retained in their respective receptacles by the casing 8 until a selector sleeve aperture 7 aligns with the opening 9, freeing an article from its receptacle. The next article is released when the adjacent selector sleeve aperture in the helical row advances to coincide with the opening. With each revolution the number of articles released will correspond to the number of apertures in the helical row of the selector sleeve. The rate of delivery is determined by the angular speed of rotation and the number of receptacles in each helical row.

Once every revolution the selector sleeve is stepped relative to the magazine to bring a new row of articles into alignment with selector sleeve apertures. Stepping takes place as the outer tooth 12 of gear 11 engages the fixed stud 16. The magazine, being driven, continues rotation, and since the stud 13a is in engagement with 12a, the lower tooth, the detent means 14 and 15 is released and the gear 11 is made to rotate through 90° stepping the selector sleeve relative the the magazine an angular amount equal to the angular spacing of the receptacles 2 (which is equal to angular spacing of the studs 13). After the gear 11 has rotated 90° it will again be releasably locked in position when the ball 14 mates with the next recess 15.

The stepping means can take various forms. An alternative to that shown may comprise an escapement mechanism which similarly steps or ratchets the selector sleeve with respect to the magazine once every revolution. Another alternative may involve the use of a stepping motor as illustrated in FIG. 3.

Referring to FIG. 3, the dispenser comprises a rotatable cylindrical magazine 30 with receptacles 31, a rotatable selector sleeve 32 with a helical row of apertures 33, and an outer casing 34 with opening means 35. The selector sleeve 32 is driven by motor 36. The magazine is operatively interconnected to the selector sleeve by stepping means comprising a stepping motor 37 and suitable triggering means 38 which is activated once every revolution. As in the embodiment of FIGS. 1 and 2, the stepping means provides for sychronized rotation of the magazine 30 and selector sleeve 32 for a major portion of each revolution, and once every revolution, initiated by the triggering means 38, steps the magazine 30 relative to the selector sleeve 32 angularly an amount corresponding to the angular spacing of adjacent receptacles 31.

In order to provide uniformly timed sequence of article release, without interruption during stepping, stepping must be completed within the time period between the release of successive articles.

Also, in order to provide uniformly timed sequence of article release, the helical row of the selector sleeve apertures will extend angularly through 360° such that release of the last article of one particular row will be followed uniformly, without gap or overlap, by release of the first article of the next row, after stepping. With such an arrangement, as is illustrated in the drawings, the number of helical rows in the magazine, the number of receptacles in each row, and the number of apertures in the selector sleeve row will be equal.

Although the embodiments shown have only one helical row of selector sleeve apertures, it can be seen that having an additional row diametrically opposed to the first will double the number of articles dispensed per revolution. By displacing one half of the casing opening means angularly an amount equal to one half of the angular spacing of the helical row of apertures, article release will alternate uniformly between the two opening halves.

If it is desired to provide a magazine of increased capacity by increasing its length, the helical rows can be made to extend angularly through an integer multiple of 360°. This arrangement can provide release of multiple articles simultaneously, or by angularly staggering the outlet means can provide sequential release.

Preferably, the device will be operated with the longitudinal axis substantially horizontal and with the opening means disposed near the bottom such that the article will fall from the magazine under the force of gravity. If gravity is not utilized, i.e., if the axis is disposed vertically, centrifugal force generated by rotational speed is available to effect article egress. Alternatively, other means, such as springs or electromagnetic devices, may be associated with each receptacle to effect or assist article egress.

Before the dispensing operation commences, the articles to be dispensed are placed in the receptacles. Preferably the magazine is made separable from the apparatus to facilitate loading. FIG. 3 shows removable end portions 39 and 40 for the casing 34 and selector sleeve 32, respectively, to allow withdrawal of the magazine 30. When large numbers of articles are to be dispensed, i.e., more than may be contained in one magazine, it may be desirable to provide additional pre-loaded magazines which can be readily interchanged. To retain articles in such additional magazines during storage and handling, prior to loading, a temporary retaining sleeve may be placed around it. The thickness of the retaining sleeve, and/or the clearance between the magazine and sleeve will preferably be designed such that the magazine can be inserted with the retaining sleeve on. The temporary retaining sleeve is withdrawn when the magazine is in place.

One use envisaged for the present dispensing apparatus is aerial reforestation involving the dispensing of containerized seeds or seedlings. An example of a suitable container is detailed in applicant's co-pending United States Patent Application Ser. No. 919,798. In a typical aerial planting operation the tree spacing required will be about eight feet. An aircraft might, for example, carry five dispensers laterally spaced eight feet apart and, flying at 60 mph, would release containers from each dispenser at a rate of 11 per second. If the dispenser is designed to carry 484 containers disposed in 22 rows with 22 containers per row the required rotational speed of the magazine will be one revolution every 2 seconds and the magazine will be emptied in 44 seconds. The aircraft would release 2420 containers over a swath 32 feet wide and ¾ mile long (approximately 2.6 acres).

I claim:

1. An aerial dispensing apparatus comprising:
   a cylindrical magazine having a plurality of receptacles for receiving articles arranged in helical rows about the periphery thereof, said magazine being rotatable about a central longitudinal axis thereof,
   a rotatable selector sleeve disposed concentrically around the magazine, said selector sleeve having a helical row of apertures arranged to align with a row of receptacles of the magazine,
   stepping means operatively interconnecting said selector sleeve with the magazine for synchronized rotation throughout a major portion of each revolution thereof and, once every revolution, to step the selector sleeve, relative to the magazine, angularly an amount corresponding to the angular spacing of adjacent helical rows of receptacles of the magazine,
   an outer casing disposed around the selector sleeve, said casing having longitudinally extending opening means for allowing sequential release of articles from the receptacles as the apertures of the selector sleeve sequentially align with said opening means.

2. The apparatus of claim 1 wherein said helical row of selector sleeve apertures extend angularly through 360° or an integer multiple thereof.

3. The apparatus of claim 1 wherein the longitudinal axis is disposed substantially horizontally and the opening means is disposed in a lower region of the casing.

4. The apparatus of claim 1 wherein said magazine is removable for loading with articles.

5. The apparatus of claim 1 wherein said selector sleeve has two or more helical rows of apertures.

* * * * *